(12) United States Patent
Ray et al.

(10) Patent No.: US 11,703,193 B2
(45) Date of Patent: Jul. 18, 2023

(54) HYBRID LIGHT EMITTING DIODE TUBE WITH SELECTABLE LIGHT SETTINGS

(71) Applicant: LEDVANCE LLC, Wilmington, MA (US)

(72) Inventors: Soumya Kanta Ray, Methuen, MA (US); Anil Jeswani, Acton, MA (US)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 17/218,768

(22) Filed: Mar. 31, 2021

(65) Prior Publication Data

US 2022/0316660 A1    Oct. 6, 2022

(51) Int. Cl.
*F21K 9/272*    (2016.01)
*F21V 19/00*    (2006.01)
*F21V 23/00*    (2015.01)
*F21V 23/04*    (2006.01)
*F21Y 115/10*    (2016.01)

(52) U.S. Cl.
CPC .......... *F21K 9/272* (2016.08); *F21V 19/0005* (2013.01); *F21V 23/005* (2013.01); *F21V 23/0421* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 8,622,571 B2* | 1/2014 | Hartikka | ................ | H05B 45/50 |
| | | | | 362/555 |
| 8,847,475 B2* | 9/2014 | Heil | ................... | H05B 45/3725 |
| | | | | 315/32 |
| 9,480,123 B2* | 10/2016 | Van Dijk | ............... | H05B 45/50 |
| 10,197,224 B1* | 2/2019 | Macias | ................. | H05B 45/20 |
| 10,683,969 B2 | 6/2020 | Jeswani et al. | | |
| 10,920,972 B2 | 2/2021 | Ray et al. | | |
| 11,209,150 B1* | 12/2021 | Lu | .......................... | F21K 9/275 |
| 2015/0022114 A1* | 1/2015 | Kim | ....................... | F21K 9/272 |
| | | | | 315/294 |
| 2017/0108180 A1* | 4/2017 | Lee | ........................... | F21K 9/27 |
| 2018/0112837 A1* | 4/2018 | Sadwick | .............. | H05B 47/105 |
| 2019/0338934 A1* | 11/2019 | Ray | .......................... | F21K 9/27 |
| 2021/0054974 A1* | 2/2021 | Li | ......................... | F21V 23/006 |
| 2021/0404608 A1* | 12/2021 | Li | ......................... | F21V 17/164 |

* cited by examiner

*Primary Examiner* — Anh Q Tran
(74) *Attorney, Agent, or Firm* — Tutunjian & Bitetto PC

(57) ABSTRACT

A tube lamp including a light source including at least one string of light emitting diodes within a tube body; end caps having pin contacts on each end of the tube body; and driver electronics including a filament detector portion provided by a passive resistance capacitor (RC) circuit that simulates the filament load of a fluorescent lamp when installed into a ballast containing fixture. The tube lamp may also include a switch for selecting light characteristics for light emitted by the light source.

18 Claims, 10 Drawing Sheets

HYBRID LIGHT EMITTING DIODE TUBE WITH SELECTABLE LIGHT SETTINGS

TECHNICAL FIELD

The present disclosure generally relates to lighting, and more particularly to lamp tubes used with light sources including light emitting diodes (LEDs).

BACKGROUND

Fluorescent light fixtures have been a popular form of lighting for many decades. A fluorescent lighting fixture includes one or more fluorescent tubes, with each tube having an end cap on each end of a tube. Lighting systems based on LED light sources are a fairly new technology in the lighting field. LED's are desirable because they have no mercury, and therefore, are more environment friendly. LED's also have a much longer lifetime, and use less power than fluorescent tubes of equivalent output.

SUMMARY

A hybrid light emitting diode tube lamp is provided that can be operated in a fixture for at least lamps, such as a ULType A T8 lamp, a UL Type B T8 lamp, and a T12 lamp, and includes a mechanism for selecting lighting characteristics for the light emitted by the tube lamp.

In one embodiment, the lamp includes a light source including at least one string of light emitting diodes within a tube body, and end caps having contacts on each end of the tube body. The lamp includes driver electronics including a filament detector portion provided by a passive resistance capacitor (RC) circuit that simulates the filament load of a fluorescent lamp when installed into a ballast containing fixture. The lamp further includes a switch for selecting light characteristics for light emitted by the light source.

In another embodiment, the tube lamp is provided that may include a light source including at least one string of light emitting diodes within a tube body, and end caps having contacts with a G13 pin layout at each end of the tube body. The lamp may include driver electronics including a filament detector portion provided by a passive resistance capacitor (RC) circuit that simulates the filament load of a fluorescent lamp when installed into a ballast containing fixture for a T12 lamp or a type A T8 lamp. The lamp further includes a switch for selecting light characteristics for light emitted by the light source.

In yet another embodiment, the lamp may include a light source including at least one string of light emitting diodes present within a tube body, and end caps having contacts on each end of the tube body. The end caps of the lamp may further include a switch for selecting light characteristics for light emitted by the light source.

BRIEF DESCRIPTION OF THE DRAWINGS

The following description will provide details of embodiments with reference to the following figures wherein.

DETAILED DESCRIPTION

Figure 1:
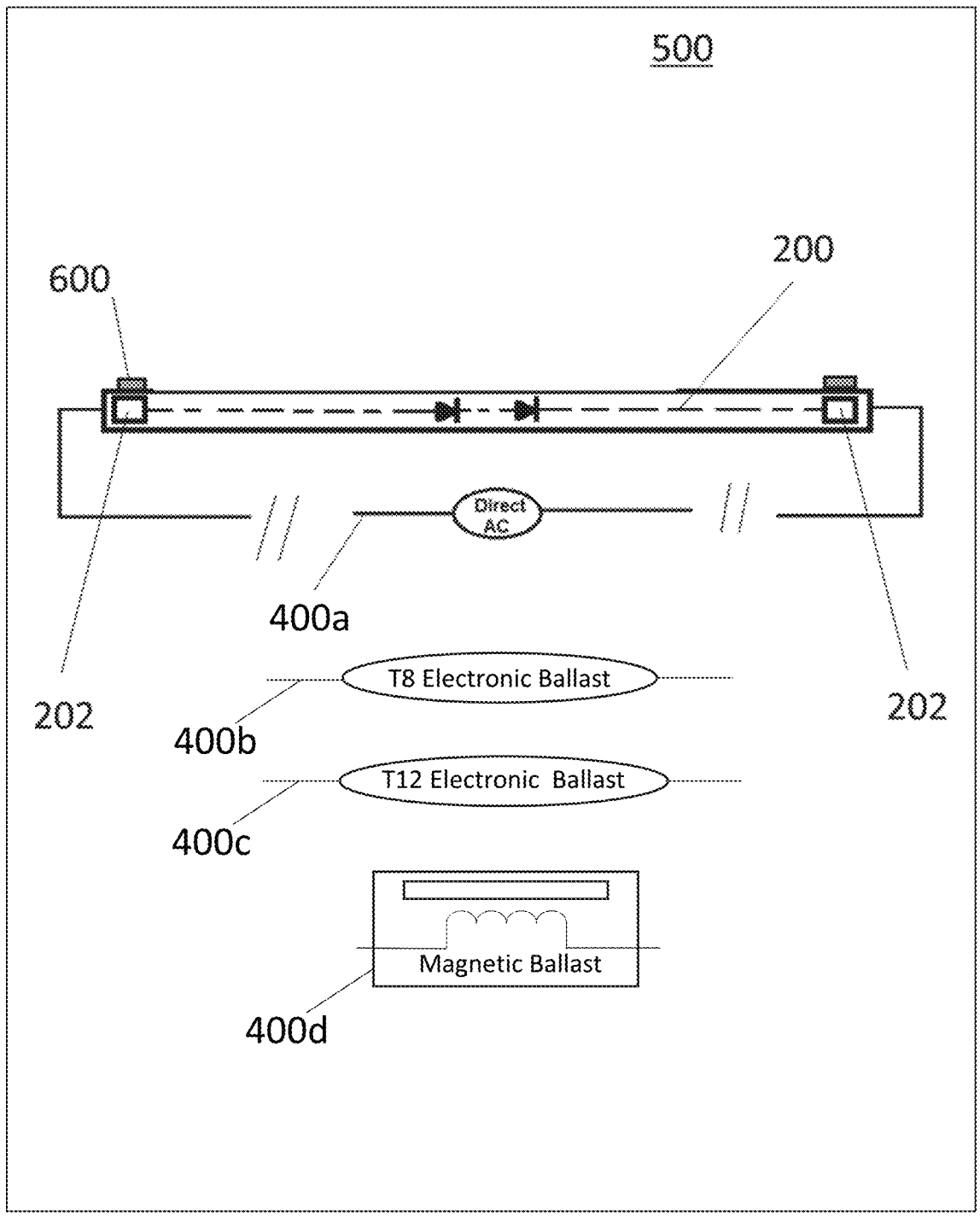
FIG. 1 is an illustration depicting one embodiment of a light emitting diode (LED) tube that is suitable for three lamps types, i.e., UL Type A T8 lamp, UL Type B T8 lamp and T12 lamp, in which the lamp further includes a switch for selecting light characteristics for light emitted by the light source.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

As light emitting diode (LED) light sources become a more attractive solution to lighting in fluorescent type lighting fixtures, glass tubes have been considered for light emitting diode (LED) lighting. There are a number of different types and standards for tube lights. Some examples of standards for tube lighting include UL Type A T8 lamp, UL Type B T8 lamp, and T12 magnetic and electronic ballast lamps. These types of tube lighting employ a G13 socket. The G13 pin type is a double pin design, in which the center to center distance between the two pins is 0.50 inches (12.7 mm), and the din diameter is 0.093 inches (2.35 mm). In addition to T8 and T12 tube types, the G13 socket design is also suitable for T10 type tube lamps.

In some embodiments, the present disclosure provides a tube lamp with selectable correlated color temperature (CCT) settings, and optionally selectable lumens settings, in which the settings can be selected by switches. In some embodiments, the switch for selecting the lighting characteristics to be emitted by the light source are fixed to a least one of the end caps of the tube lamp structure. In some examples, the methods and structures described herein can provide different light color levels (CCTs) and different light output (lumen) levels in a single tube lamp. In some embodiments, via selectable switch, a lighting designer can adapt the tube lamp to an application space by selecting appropriate light and color levels. In some embodiments, the tube lamp that are described herein provide selectable/switchable light level and light color settings in a single tube lamp for both new construction and retrofit applications. In some examples, the tube lamp structures having selectable/switchable light level and light color settings that can include switchgear fixed to the end caps of the tube lamp offers good flexibility to a lighting designer or specifier for selecting either different light colors (CCTs of 3000K/5000K/4000K) or different light output levels (three light output levels of 700/900/1500 lumens). In some embodiments, the selector switches for selecting the different types of light output level, e.g., lumen levels, and/or different types of light color, e.g., correlated color temperature (CCT) settings, are device mounted on a single unit. In some embodiments, the light designs of the present disclosure are suitable for 120-277V applications, as well as 347V applications, and can be 0-10V dimmable.

The structures provided herein provide a hybrid LED tube lamp for use with both T8 and/or T12 lamp sizes, or any other lamp size that employs a G13 socket. For example, the designs of the present disclosure provided herein allow an installer of the lamps to use the same LED tube to replace each of the following lamp types: 1) Type A T8 lamp, 2) Type B T8 lamp and/or 3) T12 magnetic and electronic ballast lamps. The structures described herein are scalable. For example, they lamp designs described herein can be adapted for either 2', 3', 4' or 8' lamp sizes.

Prior to the lamp designs of the present disclosure, depending on the ballast installed in the fixture, e.g., magnetic, high frequency or no ballast, the user had to acquire the specific lamp type design for the specific lamp fixture. For example, if the fixture in which the replacement lamp is to be installed already has high frequency (HF) ballast installed then the installer has to choose the Type A LED T8 Tube that is compatible with T8 HF ballast. In another example, if T12 magnetic ballast are installed in an application, the installer wishing to install a replacement lamp has to choose the LED T8 Lamp that is compatible with T12 magnetic ballast. In another example, if the lamp fixture in which the installer wants to replace lamp does not employ a ballast, i.e., a ballast free application, then Type B LED T8 tube lamps that use direct line voltage of 120V/277V can used.

Each of these 3 lamp types have different lamp designs (driver) to work with these specific ballasts.

The lamp designs described herein enables compatibility to these three types of lamps, i.e., 1) Type A T8 lamp, 2) Type B T8 lamp and/or 3) Type A T12 lamps that will work with magnetic and electronic ballast lamps, and offers a lot of flexibility to the installer of what type of replacement lamps can be employed in a fixture employing a G13 socket design, i.e., a socket design for accepting a G13 pin design. The lamp designs described herein have the following advantages: 1) the LED tube lamp of the present disclosure allows replacement of either T8 or T12 Florescent lamp types; T8 or T12 can be used in the same fixture as they both use the same G13 Lamp socket; 2) the LED tube lamp of the present disclosure does not need an external starter while operating with a magnetic ballast; 3) the LED tube lamp of the present disclosure allows flexibility to the installer by accommodating and enabling usage on 3 major installation conditions; and 4) the LED tube lamp of the present disclosure simplifies logistics, supply chain and minimizes inventory levels.

Further, as noted above, the tube lamp structure may include a switch for selecting lighting characteristics for the light being emitted by the light source, e.g., light emitting diode containing light engine of the tube lamp. For example, the switch may be used to select the color correlated temperature (CCT) of the tube lamp, and the switch may be referred to as a CCT select switch. The CCT select switch can be used to select light color to be emitted by the light source of the tube lamp having a defined value, and the select switch may be used to select 1 value out of three option values for the color correlated temperature that can be selected using the switch. It is noted that the switch can provides any number of optionally selected lighting characteristics, e.g., the switch can be used for selecting either two (2) or three (3) or four (4) or five (5) CCT options. Having a select switch for selecting the lighting characteristics emitted by the tube lamp can further simplify logistics, supply chain and minimizes inventory levels.

As will be described herein, in one example, a universal hybrid CCT select LED tube including integrated light characteristic selecting switching is proposed that works to replace the following lamp types:

(1) Type A T8 lamp that operates with compatible ballasts and drivers;

(2) Type B T8 lamp that operates on a direct line voltage, e.g., 120/277V or 347V;

(3) T12 lamp that operates with magnetic ballasts; and (4) T12 lamp that operates with traditional T12 electronic ballasts;

and includes a switch for selectable light characteristics for emission by the light source of the tube lamp selected from the following three options:

(A) a first color correlated temperature (CCT) of 3000K;

(B) a second color correlated temperature (CCT) of 4000K (or 3500K); and (C) a third color correlated temperature (CCT) of 5000K.

The methods and structures that are provided herein are now described with more detail with reference to FIGS. 1-9.

FIG. 1 depicts one embodiment of a light emitting diode (LED) tube lamp 500 that is suitable for multiple lamp fixture types. In some embodiments, the LED tube lamp 500 can be used or installed in any type of fixture that requires a Type-A LED T8 compatible ballast, such as a traditional T8 IS (instant start) ballast, or a T8 PS (programmable start)(collectively identified by reference number 400b); Type-B LED T8, which is ballast free or no ballast (direct AC)(identified by reference number 400a); T12 electronic ballasts (identified by reference number 400c) and magnetic ballast (identified by reference number 400d), such as T12 magnetic ballasts. Further, the LED tube lamp 500 is compatible in application as a replacement of traditional florescent lamp.

Referring to FIGS. 1-5, in some embodiments, to provide an LED tube lamp 500 for a retrofit application as a replacement of a florescent type lamp, the LED tube lamp 500 may include an LED driver 202 having a filament detection portion 702 for detecting the filament load suitable for being compatible with the aforementioned lamp fixture types, a switch 600 for selecting lighting characteristics of the lamp 500, and at least one string of light emitting diodes (LEDs) 201 for a light source. In some embodiments, the filament detection portion 702 of the electronics package 700 includes a passive resistor-capacitor circuit (RC circuit) that simulates the filament load of the traditional florescent lamp.

Figure 2A:
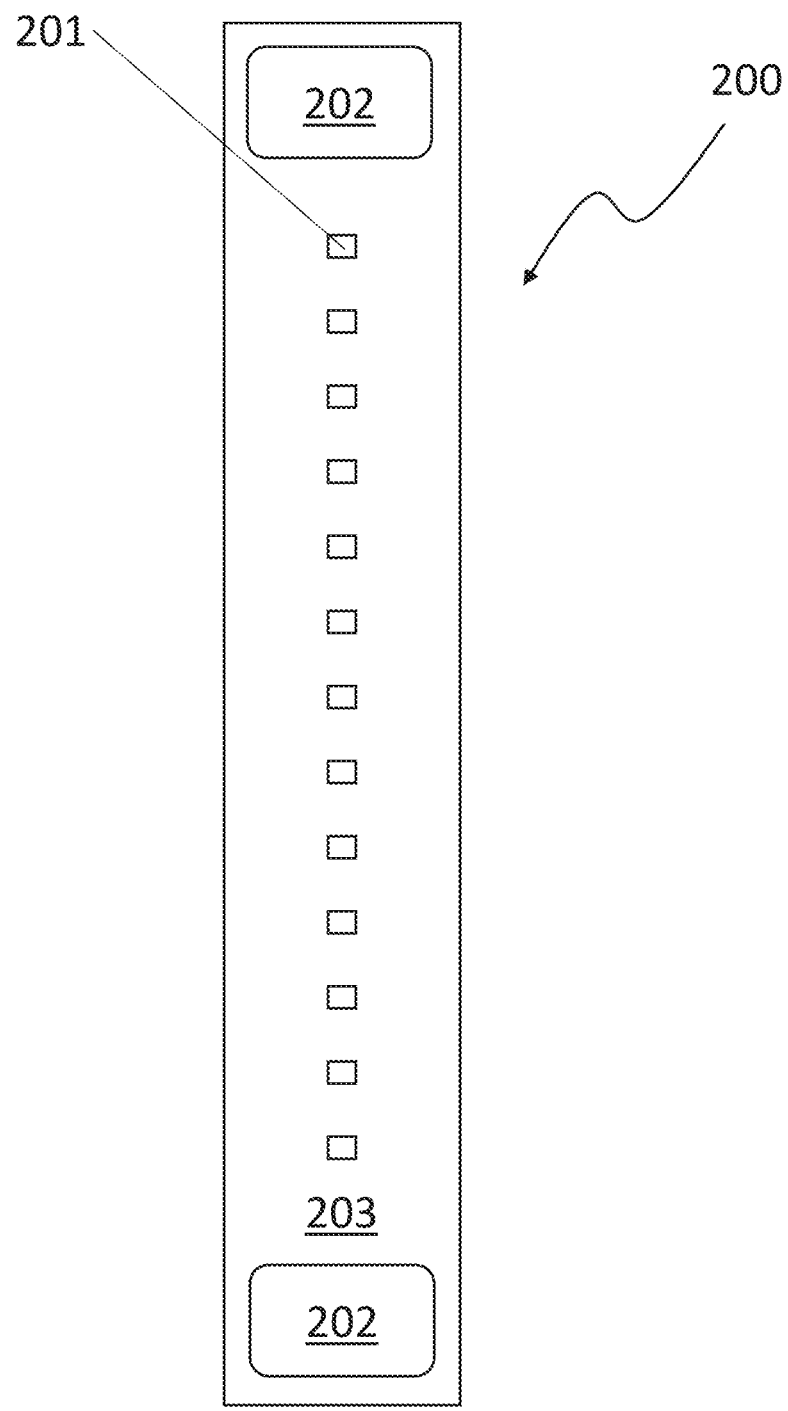
FIG. 2a is a top down view of a light source including a single string of light emitting diodes (LEDs) that may be used in an light emitting diode (LED) tube, in accordance with one embodiment of the present disclosure.
Figure 2B:
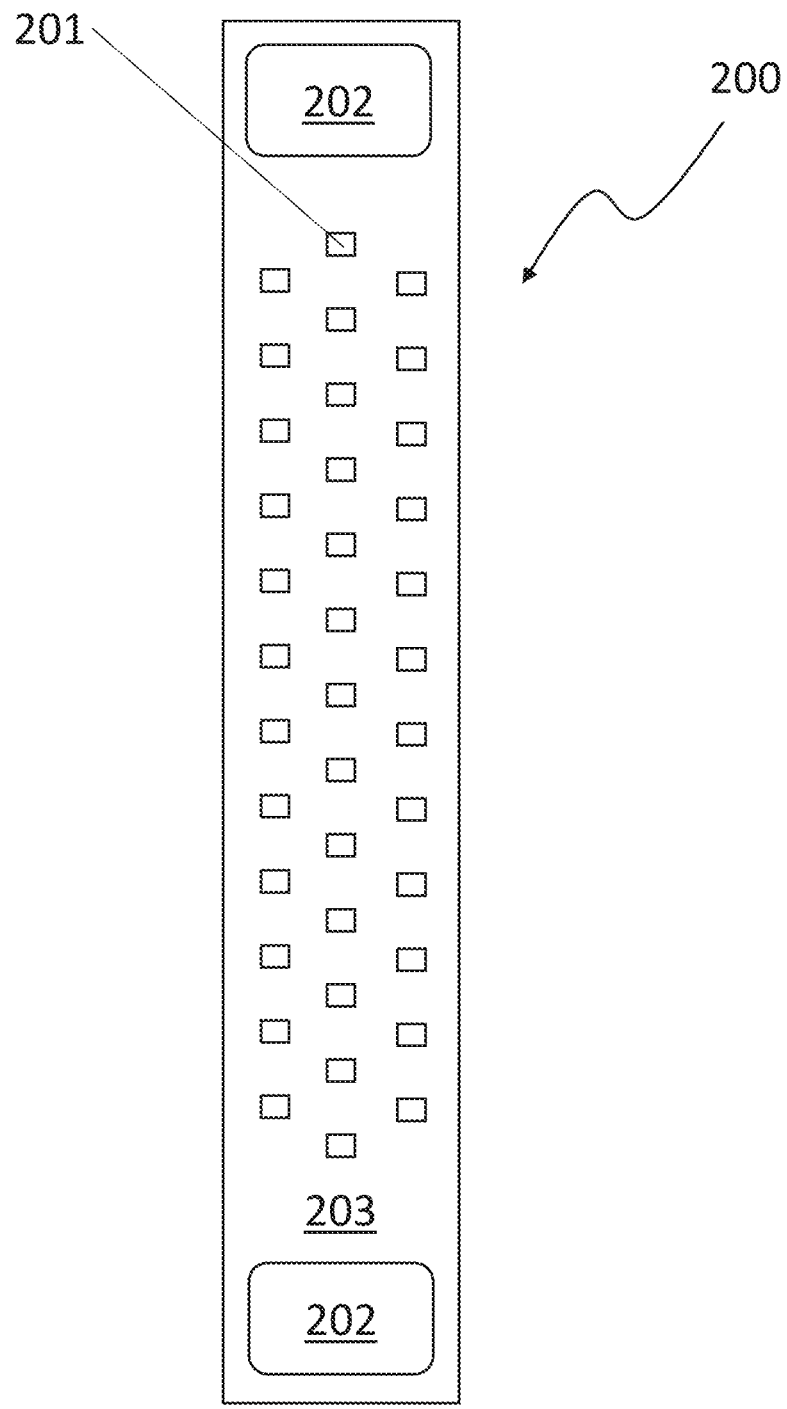
FIG. 2b is a top down view of a light source including multiple strings of light emitting diodes (LEDs) that may be used in a light emitting diode (LED) tube, in accordance with one embodiment of the present disclosure.

FIG. 2A depicts one embodiment, in which a single string of light emitting diodes (LED) 201 is depicted, in which the string is arranged in a single column. FIG. 2B depicts another having a plurality of strings of light emitting diodes (LEDs) 201 present on a substrate 203, e.g., PCB substrate, in which the strings of light emitting diodes (LEDs) 201 are positioned in adjacent columns. In some embodiments, the strings of LEDs 201 are mounted on a PCB 203 which is mounted on inside surface of the glass tube 100. The LED driver 202 can be mounted inside the two end caps 301a, 301b. In some embodiments, the LED driver 202 is a switch mode power supply design. In some embodiments, a two stage design may be employed to get better efficiency while operating with a Magnetic ballast.

Figure 3:
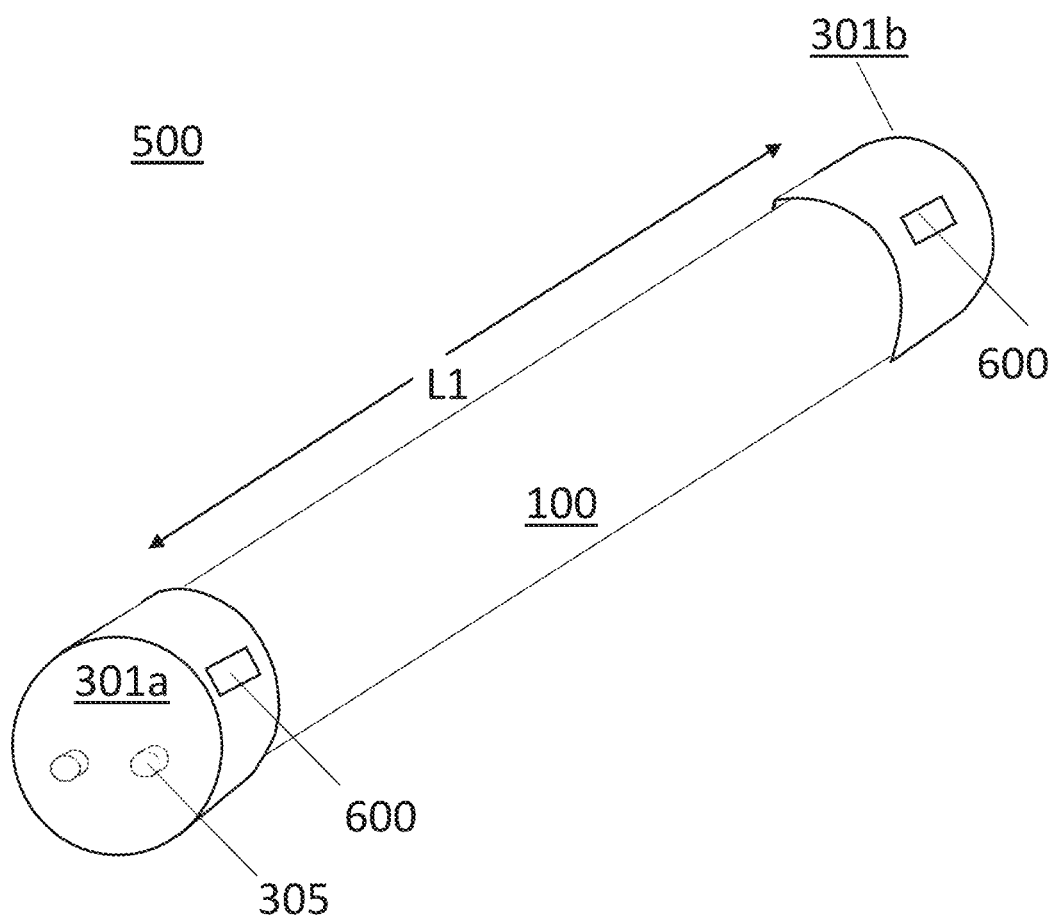
FIG. 3 is a perspective view of a light emitting diode (LED) tube, in accordance with one embodiment of the present disclosure.
Figure 4:
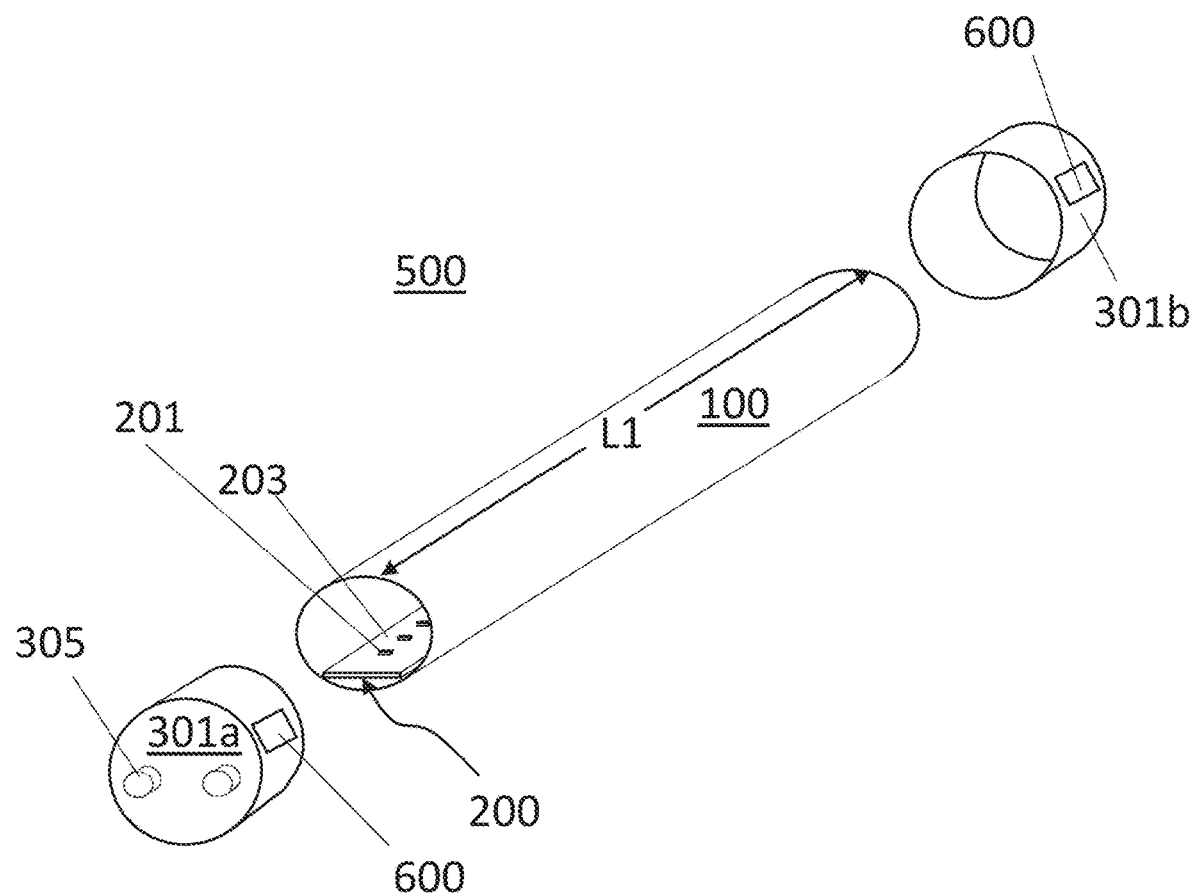
FIG. 4 is a perspective exploded view of the light emitting diode (LED) tube that is depicted in FIG. 3.
Figure 5:
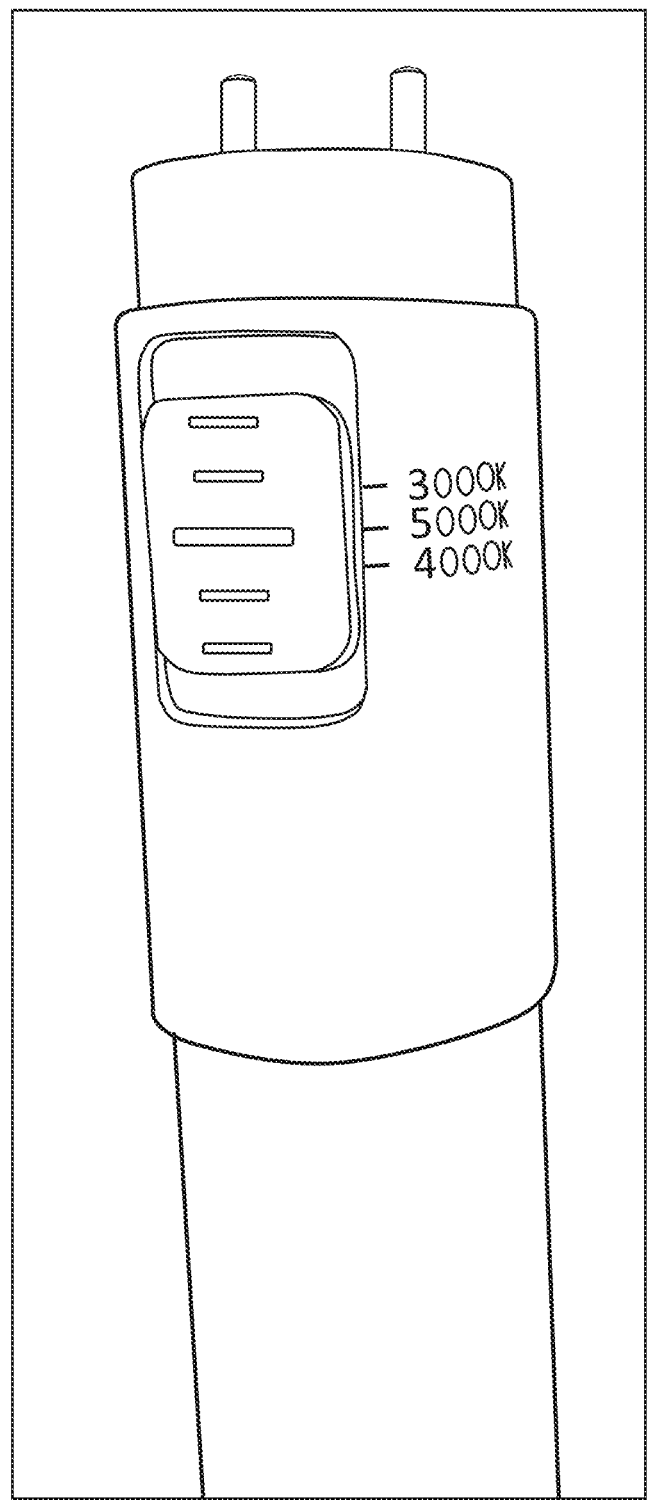
FIG. 5 is a magnified perspective view of the switch for selecting light characteristics for light emitted by the light source in the tube lamp that is depicted in FIGS. 1, 3 and 4.

Referring to FIGS. 1-5, in some embodiments, the LED tube lamp 500 includes a switch 600 for selecting light characteristics for light emitted by the light source 200, e.g., light emitting diodes 201 of the light source 200. In some embodiments, the switch 600 for selecting the light characteristics for the light being emitted by the light source 200 may be positioned on the end caps 301a, 301b for the tube lamp. Referring to FIG. 5, in some embodiments, at least one of the end caps 301a, 301b includes at least one interface on the lamp housing 100 for selecting a lighting characteristic, such as a correlated color temperature (CCT) or a lumen setting for the light being emitted by the light source 200 of the tube lamp 500. Although FIG. 5 depicts a single switch 600 that is specific for selecting correlated color temperature (CCT) positioned on a single end cap 301a, 301b, the present disclosure is not limited to only this example. For example, a second switch for selecting a lumen level for the light being emitted by the light source 200 may also be present on the same end cap having the switch for selecting the color correlated temperature (CCT). In other examples, one switch 600 may be present on a first end cap 301a on one side of the lamp tube 500, while a second switch is present on a second end cap 301b at the opposing end of the tube lamp 500, as depicted in the examples illustrated in FIGS. 1, 3 and 4. In one example, the first switch 600 on the first end cap 301a may be employed to select correlated color temperature (CCT), while the second switch 600 on the second end cap 301b may be employed to select the lumen values for the tube lamp 500.

In some embodiments, the switch 600 for selecting each of the settings may be a slide switch, toggle switch, a pushbutton switch, and/or a selector switch. Slide switches are mechanical switches using a slider that moves (slides) from a first position to at least a second position, in which the different positions correspond to different selected light characterizations for emission. Toggle switches are actuated by a lever angled in one of two or more positions. Pushbutton switches are two-position devices actuated with a button that is pressed and released. Selector switches are actuated with a rotary knob or lever of some sort to select one of two or more positions. Like the toggle switch, selector switches can either rest in any of their positions or contain spring-return mechanisms for momentary operation. It is noted that the above examples are provided for illustrative purposes only, and are not intended to limit the types of switches that are to be used in accordance with the present disclosure. Any switch used to interrupt the flow of electrons in a circuit can be suitable for use as a switch 600 for selecting settings for the lumen output of the light emitted by the downlight and/or selecting the correlated color temperature (CCT) of the light emitted by the tube lamp 500. In one example, the simplest type of switch is one where two electrical conductors are brought in contact with each other by the motion of an actuating mechanism.

In the example depicted in FIG. 5, the switch 600 for selecting the light characteristics for the light being emitted by the light source 200 may be a three position sliding switch, in which the positions for selection by the switch 600 include correlated color temperature (CCT) for values, such as 3000K, 4000K (or 3500K) and 5000K. Although not depicted in the supplied drawings, a second switch may be present for selecting lumen settings. For example, a second switch 600 may be configured to select a lumen setting from three possible settings, e.g., a first lumen setting of 700 LM, a second lumen setting of 900 LM, and a third lumen setting 1500 LM.

It is noted that the above described number of selectable settings provided by the switches 600 is provided for illustrative purposes only and is not intended to limit the present disclosure. For example, the number of selectable settings that may be selected using the switches 600 may be equal to 2, 3, 4, 5, 6, 7, 8, 9 and 10, as well as any range for the number of selectable settings including a lower limit provided by one of the aforementioned examples, and an upper limit provided by one of the aforementioned examples. Further, the values for the selectable settings, e.g., lumen settings and correlated color temperature (CCT) settings, are not limited to those described above and depicted in FIGS. 1-5.

For example, a first switch 600 may select at least one correlated color temperature (CCT) setting selected from 2500K, 2600K, 2700K, 2800K, 2900K, 3000K, 3100K, 3200K, 3300K, 3400K, 3500K, 3600K, 3700K, 3800K, 3900K, 4000K, 4100 k, 4200K, 4300K, 4400K and 4500K, as well as any range for the correlated color temperature (CCT) associated with the light emitted by the LED tube including a lower limit provided by one of the aforementioned examples, and an upper limit provided by one of the aforementioned examples.

For example, a second switch 600 may select at least one lumen setting, e.g., a set of three lumen settings, selected from 500 LM, 600 LM, 700 LM, 800 LM, 900 LM, 1000 LM, 1100 LM, 1200 LM, 1300 LM, 1400 LM, 1500 LM, 1600 LM, 1700 LM, 1800 LM, 1900 LM and 2000 LM, as well as any range for the lumens associated with the light emitted by the LED tube including a lower limit provided by one of the aforementioned examples, and an upper limit provided by one of the aforementioned examples.

Although the switch 600 is depicted as being mounted to the sidewall of the end cap 301a, 301b, this is only an illustrative embodiments, and it is not intended that the present disclosure be limited to only this example. Other embodiments within the scope of the present disclosure include the switch 600 being mounted directly to the tube body 100, e.g., glass tube body and/or plastic tube body, that encircles the light source 200. In yet other embodiments, the switch 600 can be mounted to the PCB 20 of the light source 200. In this example, an access window may be present through either one of the end cap 301a, 301b and/or the tube body 100 through which the actuator of the switch 600, e.g., button, lever, knob and/or slider, extends so that it may be manipulated by an operator for selecting lighting characteristics.

Referring to FIGS. 1-5, the lamp including the switch 600 generally has a tube like geometry. For example, the lamp 500 can be either T8 or T12 type, i.e., have end caps 300a, 300b with a G13 pin design. Further the lamp 100 can either be 2', 3', 4' or 8' in length. The tube body 100 is composed of a glass composition or is composed of a plastic composition. The term "glass" denotes the material of the lamp tube 100 is composed of an amorphous solid material. The glass of the lamp tube body 100 may be any of various amorphous materials formed from a melt by cooling to rigidity without crystallization, such as a transparent or translucent material composed of a mixture of silicates. In some embodiments, the glass composition used for the tube body 100 is a soda lime silicate glass. In one example, the glass composition for the soda lime silicate glass that provides the glass of the glass tube body 100 contains 60-75% silica, 12-18% soda, and 5-12% lime. In some other examples, such as in high temperature applications, the glass composition used for the glass lamp tube 100 may be a borosilicate glass. Borosilicate glass is a silicate glass having at least 5% of boric oxide in its composition. It is noted that the above glass compositions are provided for illustrative purposes only, and are not intended to limit the tube body 100 to only the compositions that are described above, as any glass composition is suitable for use with the tube body 100. Further, plastic compositions may be equally applicable for the tube body 100.

Referring to FIGS. 3 and 4, in some embodiments, the glass tube body 100 has a cross-sectional geometry that is perpendicular to a length L1 of the glass tube body 100 with a substantially cylindrical perimeter defined by a sidewall of the glass tube body 100 enclosing a hollow interior for housing a light source. The length L1 of the glass tube body 100 extends from a first end of the glass tube body 100 for engagement by a first end cap 301a to a second end of the glass tube body 100 for engagement of a second end cap 301b. The length L1 of glass tube body 100 is greater than the width W1 (diameter) of the glass tube body 100. In some embodiments, the length L1 of the glass tube body 100 may range from 5" to 100", and the width W1, i.e., diameter, of the glass tube body 100 may range from 0.5" to 2.0". In one embodiment, the thickness T1 of the glass sidewall for the tube body 100 may range from 0.5 mm to 1.1 mm.

The dimensions, i.e., length L1 and width W1, of the glass tube body 100 may be selected to be consistent with the standard sizes of T8 and T12 fluorescent type lamps. For example, the length L1 and width W1 of the glass tube body 100 may be selected to be consistent with the T8 standard for fluorescent type lamps. In this example, the glass tube body 100 can have a width W1 (diameter) that is equal to 8/8", i.e., 1.0", and a length L1 that can be equal to 12", 24", 36", 48" or 60". In yet another example, the length L1 and width W1 of the glass tube body 100 may be selected to be consistent with the T12 standard for fluorescent type lamps. In this example, the glass tube body 100 can have a width W1 (diameter) that is equal to 12/8", i.e., 1.5", and a length L1 that can be equal to 12", 24", 36", 48" or 60".

Referring to FIGS. 1, 2a, 2b and 4, the lamp 500 further includes a string of LEDs 201 are mounted on a PCB 203 which is mounted on inside surface of the glass tube 100. The at least one string of LEDs 201 provides the light source 200 for the LED tube lamp 500. The light source 200 is provided by a light emitting diode (LED) 201 and the substrate 203 is a circuit board, e.g., printed circuit board (PCB), on which the LEDs 201 are mounted as surface mount devices (SMDs). Although other light sources and substrates are suitable for use with the glass tube body 100 that is described herein in providing a lamp 500, the light source 200 is specifically referred to as having light emitting diodes 201, and the substrate 203 is hereafter referred to as a circuit board 203, e.g., printed circuit board. For example, in addition to semiconductor type light emitting diodes (LEDs), the light source may be organic light emitting diodes, laser diodes or any like light source.

FIGS. 2a and 2b are top down views of a light source 200 that can be housed within the tube body 100, in which the light source 200 includes a plurality of light emitting diodes (LEDs) 201, e.g., surface mount device (SMD) light emitting diodes (LED), that are present on a circuit board 203, e.g., printed circuit board. A light emitting diode (LED) 201 is a light source that can be a semiconductor device that emits visible light when an electric current passes through it. The LEDs 201 of the light source 200 can include at least one LED 201, a plurality of series-connected or parallel-connected LEDs 201, or an LED array 201. At least one LED array for the light source 200 can include a plurality of LED arrays. For example, the LEDs 201 may also be arranged in a single column that extends along a majority of the length of the circuit board 203.

Any type of LED may be used in the LEDs 201 of the light source 200. For example, the LEDs 201 of the light source 200 can be semiconductor LEDs, organic light emitting diodes (OLEDs), semiconductor dies that produce light in response to current, light emitting polymers, electroluminescent strips (EL) or the like. The LEDs 201 can be mounted to the circuit board 203 by solder, a snap-fit connection, or other engagement mechanisms. In some examples, the LEDs 201 are provided by a plurality of surface mount discharge (SMD) light emitting diodes (LED) arranged in a plurality of lines on the circuit board 203.

In some embodiments, the LEDs 201 of the light source 200 can produce white light. However, LEDs 201 that produce blue light, purple light, red light, green light, ultra-violet light, near ultra-violet light, or other wavelengths of light can be used in place of white light emitting LEDs 201. In some embodiments, the emission wavelengths for the LEDs 201 of the light source 200 can range from approximately 380 nm to approximately 770 nm.

The LEDs 201 of the lamp 500 may also be selected to allow for adjusting the "color temperature" of the light they emit. The color temperature of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in Kelvin, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs 201 of the lamps provided by the present disclosure in some embodiments can be adjusted from 2K to 7K.

The LEDs 201 of the lamp 500 may also be selected to be capable of adjusting the light intensity/dimming of the light they emit. In some examples, dimming or light intensity may be measured using lumen (LM). In some embodiments, the dimming or light intensity adjustment of the LEDs 201 can provide for adjusting lighting between 100 LM to 2000 LM. In another embodiment, dimming or light intensity adjustment of the LEDs 201 can provide for adjusting lighting between 500 LM to 1750 LM. In yet another embodiment, the dimming or light intensity adjustment of the LEDs 201 can provide for adjusting lighting between 700 LM to 1500 LM.

The number of LEDs 201 for the light source 200 can be a function of the desired power of the lamp 500 and the power of the LEDs 201. For example, for a 48" lamp 500, the number of LEDs 201 that are present on the circuit board 203 of the light source can vary from about 5 LEDs 201 to about 400 LEDs 201, such that the lamp 500 outputs approximately 500 lumens to approximately 3,000 lumens.

The LEDs 201 for the light source 200 can be mounted on a circuit board 203, such as a printed circuit board (PCB). A printed circuit board (PCB) mechanically supports and electrically connects electronic components, such as the LEDs 201 and the driving electronics 202, using conductive tracks, pads and other features etched from copper sheets laminated onto a non-conductive substrate. The printed circuit board 203 is typically composed of a dielectric material. For example, the circuit board may be composed of fiber-reinforced plastic (FRP) (also called fiber-reinforced polymer, or fiber-reinforced plastic) is a composite material made of a polymer matrix reinforced with fibers. The fibers are usually glass, carbon, aramid, or basalt. The polymer is usually an epoxy, vinylester, or polyester thermosetting plastic, though phenol formaldehyde resins are still in use. In some embodiments, the printed circuit board (PCB) is composed of a composite consistent with the above description that is called FR-4. The printed circuit board 203 is not limited to the example shown in the figures. The printed circuit board 203 may be made in one piece or in longitudinal sections joined by electrical bridge connectors.

Still referring to FIGS. 2a and 2b, the printed circuit board 203 may further include an internal built in ballast, i.e., LED driver 202, and printed circuitry providing electrical communication between the ballast and the LEDs 201, e.g., surface mount discharge (SMD) light emitting diodes (LED). The LED driver 202 is an electrical device which regulates the power to the LED 201, or a string (or strings) of LEDs 201. In some embodiments, the LED driver 202 responds to the changing needs of the LEDs 201, or LED circuit, by providing a constant quantity of power to the LED 201 as its electrical properties change with temperature. In some embodiments, an LED driver 202 is a self-contained power supply which has outputs that are matched to the electrical characteristics of the LED or LEDs 201. In some embodiments, the LED driver 202 may offer dimming by means of pulse width modulation circuits and may have more than one channel for separate control of different LEDs or LED arrays 201. The power level of the LED 201 is maintained constant by the LED driver 202 as the electrical properties change throughout the temperature increases and decreases seen by the LED or LEDs 201. In some embodiments, the supply voltage of the LED driver 202 may be equal to 2.3V to 5.5 V, 2.7V to 5.5 V and/or 3V to 5.5 V. In some embodiments, the output current per channel that can be provided by the LED driver 202 can be between 250 µA and 50 A. In some other embodiments, the LED driver 202 can have an output current per channel ranging from 20 mA to 100 mA, e.g., 25 mA.

The LEDs 50 may be arranged as strings on the printed circuit board 70. When referring to a "string" of LEDs it is meant that each of the LEDs in the string are illuminated at the same time in response to an energizing act, such as the application of electricity from the driving electronics, e.g., driver, in the downlight 100. The LEDs 201 in a string of LEDs are electrically connected for this purpose. For example, when the string of LEDs 201 is energized for illumination, all of the LEDs in the string are illuminated. Further, in some embodiments, illuminating the first string of LEDs 201 does not illuminate the LEDs in the second string of LEDs 201, and vice versa, as they are independently energized by the driving electronics, and not electrically connected. It is also noted that the same LED may be shared by more than one string. FIG. 2A depicts one embodiment, in which a string of light emitting diodes (LED) 201 is depicted, in which the string is arranged in a single column. It is noted that although FIG. 2A illustrates a single column of light emitting diodes (LED), it is not necessary that the single column function as a single string. For example, different portions of the string of light emitting diodes (LEDs) may function as different strings. FIG. 2B depicts another having a plurality of strings of light emitting diodes (LEDs) 201 present on a substrate 203, e.g., PCB substrate, in which the strings of light emitting diodes (LEDs) 201 are positioned in adjacent columns. In FIG. 2B, each column of light emitting diodes (LEDs) 201 may function as an independent string. Although the following description may refer to three strings of LEDs, as illustrated in FIG. 2B, this is only an illustrative example, and not intended to limit the present disclosure to the LED arrangement specifically depicted in FIG. 2B. Any arrangement of LED strings may be employed to provide the different characteristics of light that can be emitted by the light source 200 of the tube lamp 500 responsive to light characteristic selection through the switch 600 for selecting the light characteristics for the light being emitted by the light source 200.

For example, responsive to a light characterization selection via the switch 600 for selecting the light characteristics for the light being emitted by the light source 200, a first string of LEDs 201 may be illuminated to provide a correlated color temperature (CCT) of light emitted by the light engine 200 for the tube lamp 500 that is on the order of 3000K, a second string of LEDs 201 may be illuminated to provide an correlated color temperature (CCT) of light emitted by the light engine 200 for the lamp 500 that is on the order of 4000K (or 3500K); and a third string of LEDs 201 may be illuminated to provide an intensity of light emitted by the light engine 200 for the tube lamp 500 that is on the order of 5000K.

For example, responsive to a light characterization selection via the switch 600 for selecting the light characteristics for the light being emitted by the light source 200, a first string of LEDs 201 may be illuminated to provide an intensity of light emitted by the light engine 200 that is on the order of 500 lumens (LM), a second string of LEDs 201 may be illuminated to provide an intensity of light emitted by the light engine 200 that is on the order of 900 lumens (LM); and a third string of LEDs 201 may be illuminated to provide an intensity of light emitted by the light engine 200 that is on the order of 1500 lumens (LM).

It is noted that the above examples of how different LED strings can be illuminated to provide different lighting values are provided for illustrative purposes only. The present disclosure is not limited to only these example, as other lighting characteristics can be assigned to strings of LEDs that can be selected by a user through the switch 600. For example, the LEDs 201 of the light source 200 can be selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

Referring to FIGS. 3 and 4, in some embodiments, once the light source 200 is positioned within the glass tube body 100, end caps 301a, 301b may be positioned on each end of the glass tube body 100 having electrical contacts for communication between a lamp fixture and the LED driver 202 of the light source 200, hence providing power to the lamp 500. In some embodiments, each of the end caps 300a are composed of a polymeric material, such as silicone; a metal material, such as aluminum, or a combination, i.e., assembly, thereof. The end faces of each end cap 300a, 300b include a pair of contacts 305 for engagement with a lamp fixture. The contacts 305 are typically composed of a metal, such as aluminum, steel or copper. The contacts 305 may have a pin type geometry. To provide that the LED tube lamp 500 is compatible with T8 and T12 type lamps, the contacts 305, i.e., pins, may have a geometry that engages a G13 socket. The G13 pin type is a double pin design, in which the center to center distance between the two pins is 0.50 inches (12.7 mm), and the pin diameter is 0.093 inches (2.35 mm). In some embodiments, wires (not shown) can provide electrical communication between the end caps 300a, 300b, i.e., the contacts 305 of the end caps 300a, 300, to the electrical components of the circuit board 203, such as the electronics driver 202 for the LEDs 201. In some embodiments, the wires are made of metals, and preferably made of copper or steels. Electrical junctions can be provided through mechanical fasteners, such as nut and bolt arrangements, and/or solder like connections. As noted above, in some embodiments, the end caps 301a, 301b may include a switch 600 for selecting the light characteristics for the light being emitted by the light source 200. In some embodiments, the switch 600 is directly positioned on an exterior sidewalls of the end cap 301a, 301b, as depicted in FIG. 5.

Figure 6:
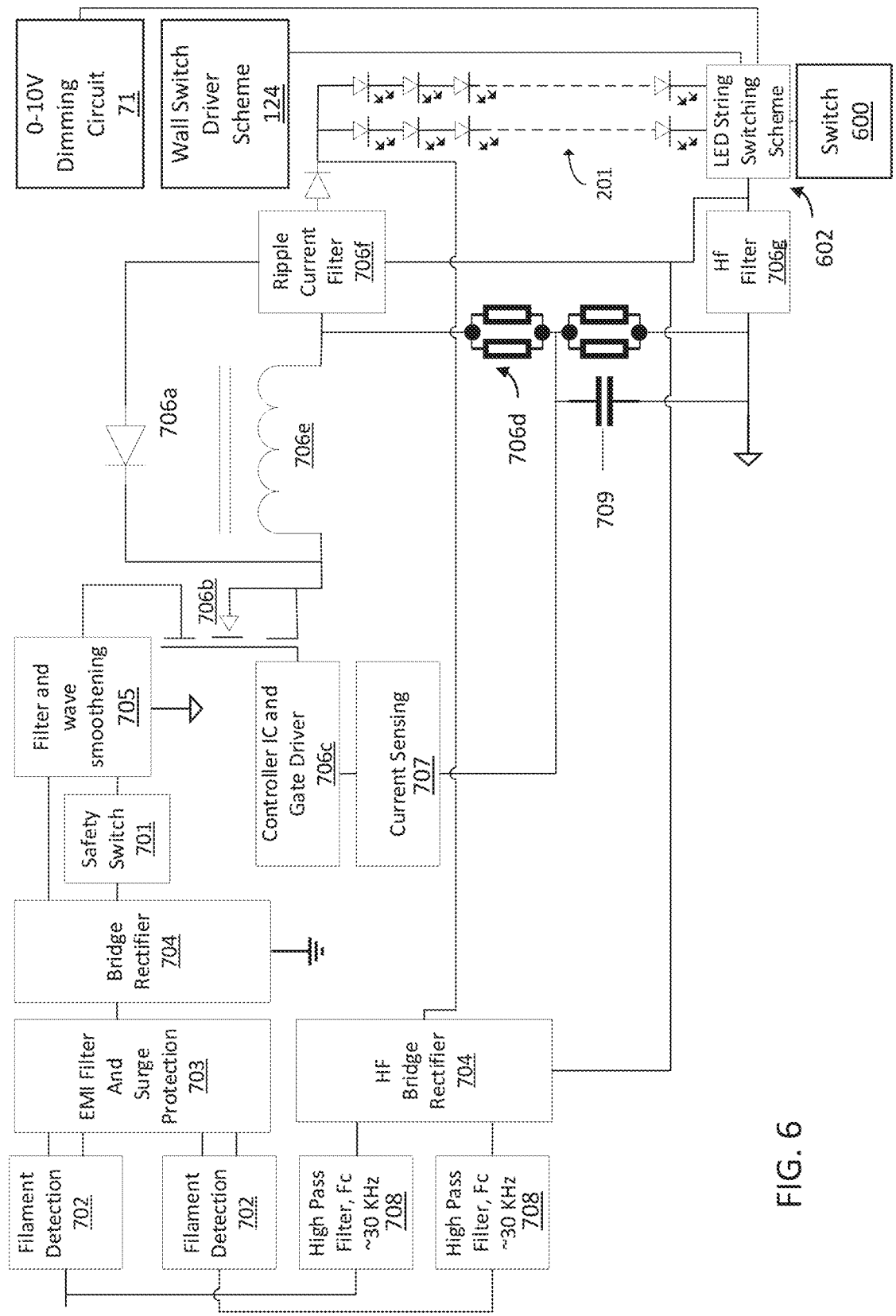
FIG. 6 is a block/circuit diagram illustrating at least a portion of the electronics package for the light emitting diode (LED) tube that has been described with reference to FIGS. 1-4.

In some embodiments, the LED lamp 500, e.g., T8 LED hybrid tube lamp, can be used in any application or fixture that requires a compatible T8, T12 ballast or direct line voltage. Referring to FIG. 6, the electronics package 700 for the light emitting diode (LED) tube lamp 500 employs a driver design that will convert the input high frequency or line frequency alternating voltage and current to a suitable DC voltage and current to drive the LED string 201 inside the lamp 500. In one embodiment, the electronics package 700 may include a filament detection portion 702, an EMI filter and surge protection portion 703, a high frequency (HF) bridge rectifier 704, a filter and wave shape smoothing portion 705, a current sensing portion 707, and LED strings 201, as well as a switch 600 for selecting the light characteristics for the light being emitted by the LED strings 201. The electronics package 700 may also include an electronic safety switch 701 and at least one high pass filter 708.

The filament detection portion 702 of the electronics package 700 has a passive resistor-capacitor circuit (RC circuit) that simulates the filament load of the traditional florescent lamp. For type A applications, i.e., type A T8 lamps, the impendence is adjusted to allow for a smooth startup when operated with high frequency (HF) ballasts and also improves the ballast compatibility. Type A applications may have an electronic ballast. The filament detection portion 702 provides high voltage and current for startup conditions for the type A application, i.e., type A T8 lamps. Following start up, the voltage and current in a type A applications, i.e., type A T8 lamps, will be reduced to a normal operating range. With Type B applications (line voltage), i.e., no ballast, this circuit does not play any role. The filament detection portion 702 of the electronics package is further described below with reference to FIG. 7.

The EMI Filter and Surge protection portion 703 of the electronics package 700 can play a significant role during direct line voltage (Type B) application. EMI circuit filters the high frequency noise generated by downstream converter from entering the mains input terminals of line and neutral. The surge protector protects the lamp from the surges caused by events such as lightning and line disturbances from the mains grid.

The HF Bridge Rectifier portion 704 of the electronics package 700 is high frequency rectifier which rectifies the AC input voltage from all the source i.e. from line voltage or from ballast (both electronic and magnetic) and convert it to pulsating DC. The rectifiers used are fast recovery type of didoes. During HF ballast application, as the input voltage from the ballast are high frequency thus its extremely important to use the fast recovery diode for the smooth rectification.

The electronic safety switch 701 of the electronics package 700 is a safety switch on the lamp to help avoid electrical shock to the user (for type B applications and in instance where they are trying to install with power on). The electronic safety switch 701 is such that it only allows to be switched on only when both the end cap pins 305 of the tube are inserted & seated properly in to the lamp socket.

The Filter and Wave Shape Smoothing portion 705 of the electronics package 700 provides additional filter circuits that removes any high frequency signal from the low frequency waveform during line voltage and magnetic ballast applications. It also helps to smooth the wave shape for the downstream converter in case of magnetic ballast application.

The Filter and Wave Shape Smoothing portion of the electronics package 700 is based on a buck converter topology and contains freewheeling diode 706a, switch 706b, controller IC 706c, starting resistor 706d, switching inductor 706e and ripple current filter 706f. This section generates the required voltage and current as per the need of the LED strings 201. In some embodiments, this is a constant current control mechanism that maintains a constant current to the LED string 21 in spite of change in input voltage. The high frequency filter 706g at the LED return path helps in fine tuning the high frequency noise in the output current.

In some embodiments, a capacitor 709 is also present in the electronics package 700 to filter out high frequency noise. This can provide that the current sensing is a clean signal without any high frequency noise.

The current sensing portion 707 of the electronics package 700 senses the switching inductor current which represents the LED current and provides the feedback to the controller IC according to which the frequency of operation or the ON time of the switch is adjusted to maintain a constant LED current.

The block diagram/circuit diagram further depicts the LED strings 201. The number of LEDs, number of LED strings, their color temperature etc. are chosen based on the requirement for the light output characteristics. These LED strings are driven by the voltage and current generated by the buck converter. Lighting characteristics for the light emitted by the LED strings 201 can be assigned to strings of LEDs by a user through the switch 600. The switch 600 for selecting each of the settings for light being emitted by the light source 200 is further described above with reference to FIGS. 1-5.

Figure 7:
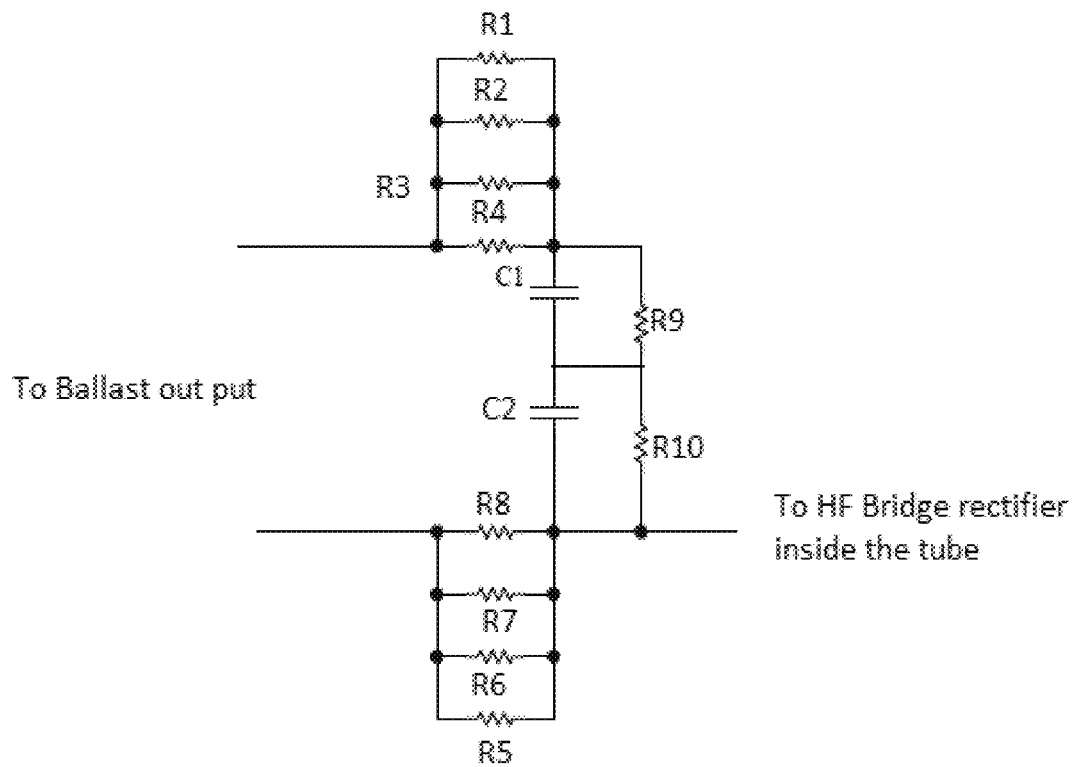
FIG. 7 is a circuit diagram for the filament detection circuit that is depicted in the block/circuit diagram that is depicted in FIG. 5.

FIG. 7 is a circuit diagram for the filament detection circuit, i.e., filament detection portion 702, that is depicted in the block/circuit diagram that is depicted in FIG. 6. The ballasts in Type A applications are designed to provide high frequency & high voltage to the filament of a traditional fluorescent lamp during lamp start up. The filament of the traditional lamp is resistive in nature.

The values of resistors R1, R2, R3, R4, R5, R6, R7, R8, R9, R10 and the capacitors C1, C2 are chosen such way that the circuit sustains the high voltage start up and exhibits a low impendence during normal operation of the ballast.

In some examples, during startup, i.e., high voltage start up, ballast provide a high voltage close 600 Vrms its open circuit voltage for a very short duration. Ballasts are designed to provide this voltage (>600 Vrms) when they powered on the florescent lamp in order to heat up the cathode filament of the florescent lamp so that it can emits the electrons and ignite the lamp. This is the typical characteristic of a florescent lamp with LED lamp this voltage is not required to ignite the LEDs however ballast are still able to enter in to this high voltage strike, which is close to 600 Vrms.

The starting method of the ballast is to detect the filament of the florescent lamp. Each florescent lamp is having a cathode filament. For 32 W florescent lamp the cathode filament impedance is close to Rsub ~12Ω and having a Rc (cold resistance)/Rh (hot resistance)~3.4Ω. In designing the LED lamp, the resistor capacitor (RC) network chosen to replace this impedance of the florescent lamp, so that ballast can understand there is a cathode resistance present and thus can start its accessories circuit. This impedance is the low impendence during normal operation of the ballast.

This will help ballast to get a proper start up current to turn on the IC and other start up circuit inside the ballast. Each end of the LED tube 100, e.g., at the cap 300a, 300b has this filament circuit available.

In some embodiments, in addition to the switch 600 for selecting the light characteristics for the light being emitted by the LED strings 201, the tube lamp 500 may also include a third light setting that can be controlled through a remote wall switch, i.e., ON/OFF wall switch, as described with reference to FIGS. 8-9.

Figure 8:
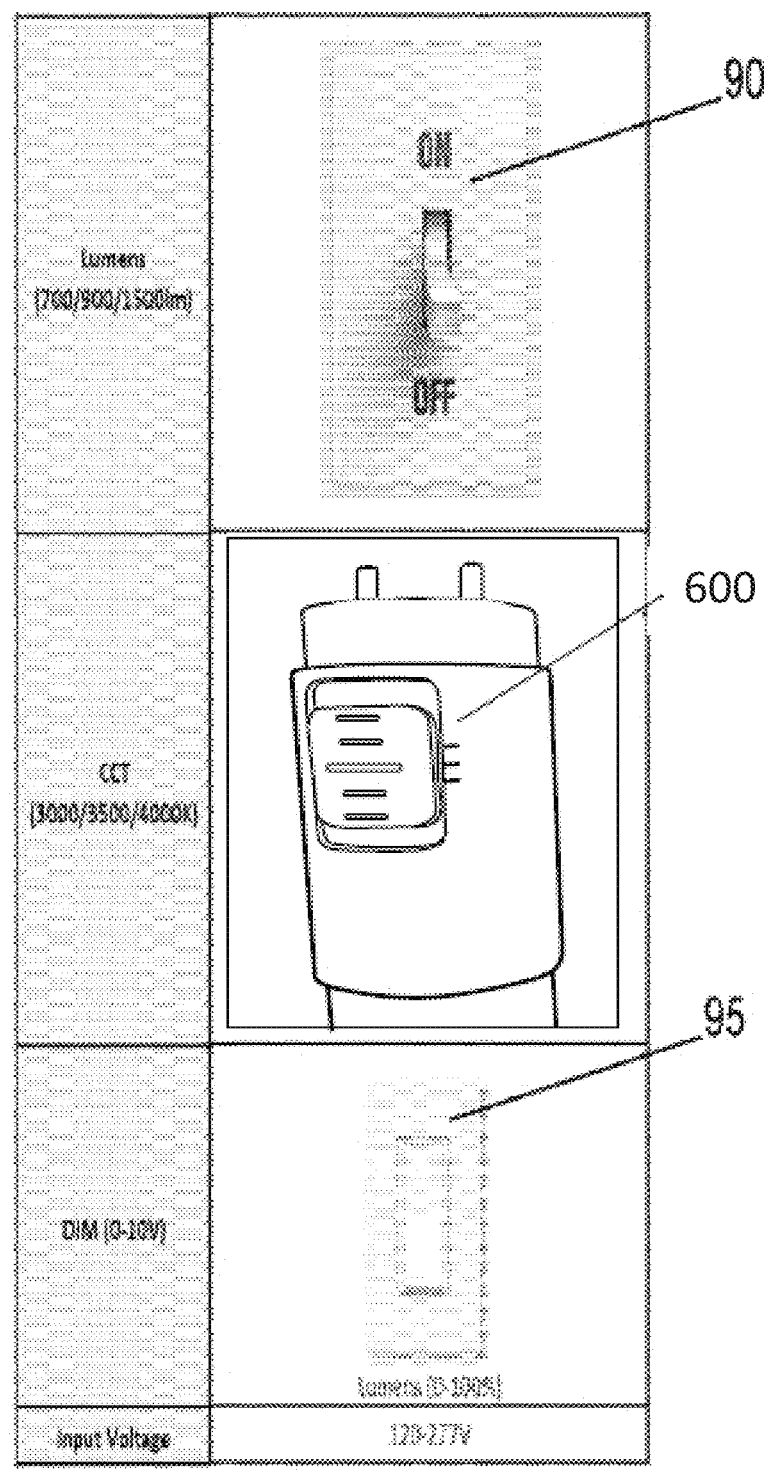
FIG. 8 is a perspective view of lamp design including a housing having a tube lamp geometry and a light engine including at least one string of light emitting diodes (LEDs), in which the lamp also includes a switch for selecting at least one correlated color temperature (CCT) setting for the light emitted by the light engine fixed to the housing, an "ON"/"OFF" wall switch for selecting at least one lumen setting for light emitted by the lamp, and a remote dimmer switch for adjusting the dimming/intensity of the light emitted by the lamp, in accordance with one embodiment of the present disclosure.

FIG. 8 depicts a lamp design including a housing having a tube lamp geometry and a light engine including at least one string of light emitting diodes (LEDs), in which the lamp also includes a switch 600 for selecting at least one correlated color temperature (CCT) setting for the light emitted by the light source 200; an "ON"/"OFF" wall switch 90 for selecting at least one lumen setting for light emitted by the lamp, and a remote dimmer switch 95 for adjusting the dimming/intensity of the light emitted by the lamp.

Figure 9:
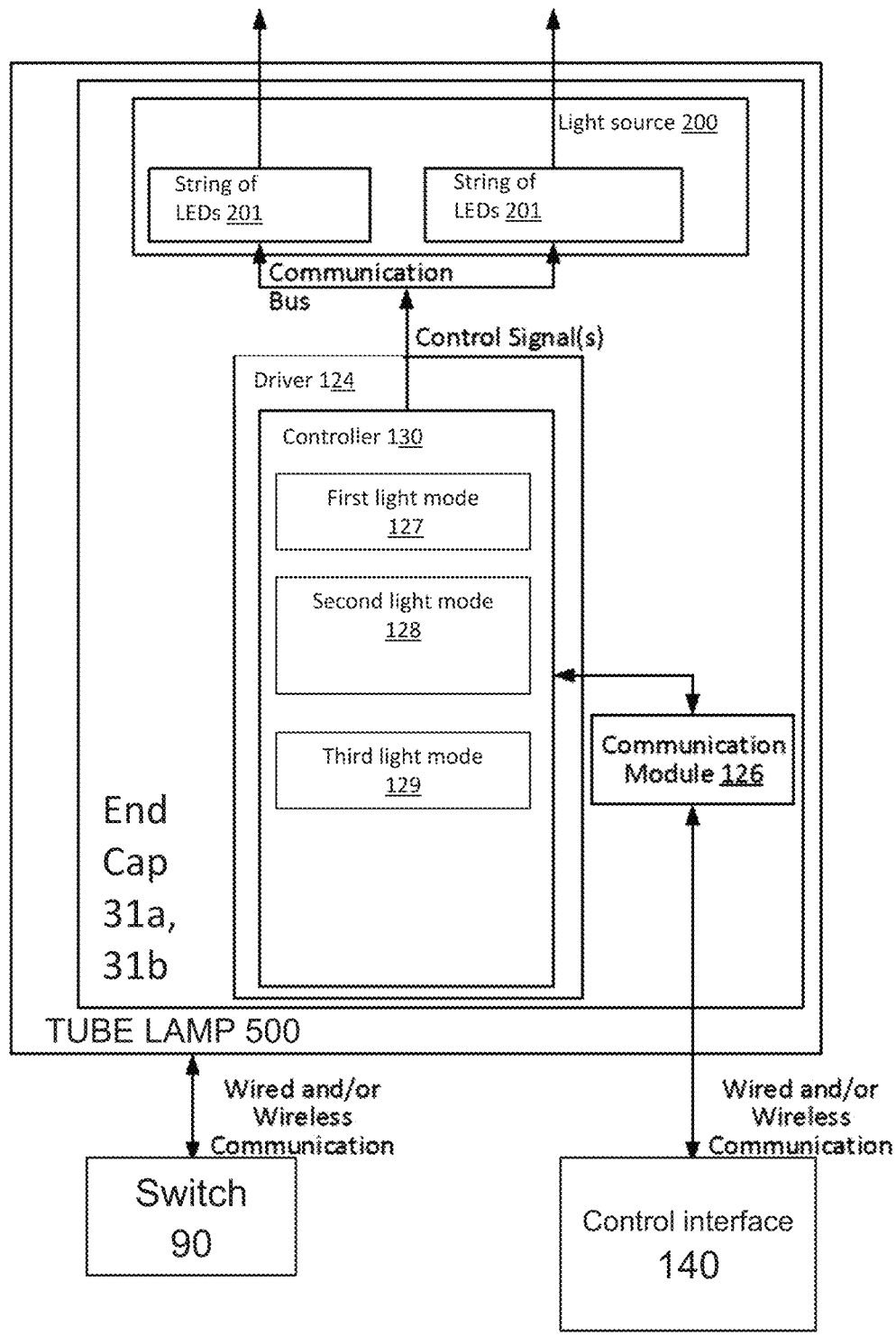
FIG. 9 is a bock diagram for a driver scheme to provide for switching between light modes, i.e., different settings for lumens, dimming and correlated color temperature of light, being emitted by a tube lamp using an ON/OFF light switch 90, as described with reference to FIG. 8, in accordance with one embodiment of the present disclosure.

FIG. 9 is a bock diagram for a wall switch driver scheme 124 to provide for switching between light modes, i.e., different settings for power level selection, lumens, dimming and correlated color temperature of light, being emitted by a tube lamp 500 using an ON/OFF light switch 90, as described with reference to FIG. 8. The wall switch driver scheme 124 may be in electrical communication with the LED string switch scheme 602 of the electronics package depicted in FIG. 6.

FIG. 8 depicts one embodiment of a lamp design including a housing having a tube lamp geometry and a light engine 200 including at least one string of light emitting diodes (LEDs) 201, in which the lamp also includes a switch 600 for selecting at least one color setting for illuminating the light source 200, an "ON"/"OFF" wall switch 90 for selecting at least one lumen level, and a remote dimmer switch 95, i.e., 0-10V dimmer wall switch, for adjusting the dimming/intensity of the light emitted by the lamp. The switch 600 for selecting each of the settings for light being emitted by the light source 200 has been described above with reference to FIGS. 1-7. As noted, in one example, the switch 600 may be used to select one of three color correlate temperature (CCT) values, such as 3000K, 3500K and 4000K. It is noted that any example of the switch 600 for selecting each of the settings for light being emitted by the light source 200 that is described above is suitable for the embodiments described herein with reference to FIGS. 8 and 9.

In addition to the light source 200 being in electrical communication with the color select switch 600, the light source 200 including the light emitting diodes 201 may also be in electrical communication with a receiver for receiving setting commands for dimming and intensity of the light being emitted by the lamp. Referring to FIGS. 8 and 9, in some embodiments, the dimming function may be controlled through a 0-10V dimming wall switch 95. The 0-10V dimming wall switch 95 is remotely mounted from the tube lamp 500. The 0-10V dimming wall switch 95 communicates with a 0-10V dimming circuit 71 in the electronics package of the tube lamp 500, as illustrated in FIG. 6.

Referring to FIG. 7, the 0-10V dimming circuit 71 is in electric communication with a 0-10V dimming input that receives the signal from the 0-10V dimming wall switch 95. The 0-10V dimming circuit 71 is in electrical communication with the LEDs 201, e.g., through an LED switching scheme 602. The 0-10V dimming circuit 71 may be referred to as a 0-10 dimmable LED driver. In lighting control applications, "0-10" describes the use of an analog controller to adjust the voltage in a 2-wire (+10 VDC and Common) bus connecting the controller to one or more LED drivers equipped with a 0-10 VDC dimming input. A 0-10V dimmable LED driver includes a power supply circuit that produces approximately 10 VDC for the signal wires and sources an amount of current in order to maintain that voltage. The controlled lighting should scale its output so that at 10 V, the controlled light should be at 100% of its potential output, and at 0 V it should at the lowest possible dimming level.

A 0-10V LED dimmable driver designs with a control chip. The 0-10V voltage changes, the power supply output current will change. For example, when the 0-10V dimming signal modulates to 0V, the output current will be 0, the brightness of the light will be off; when the 0-10V dimming modulates to maximum 10V, the output current will reach 100% power output, the brightness will be 100%.

In the embodiment that is depicted in FIG. 8, the lumen level for the light emitted by the tube lamp 500 is switched between three selectable lumen levels by flipping the wall ON/OFF switch 90 until the desired lumen level is selected. In one example, the three selectable lumen levels can include 700 lumens, 900 lumens and 1500 lumens. The switch 90 may be in wired or wireless communication with the tube lamp 500. In some embodiments, when the tube lamp 500 is turned on initially by toggling the switch 90 to its ON position, the tube lamp 500 will enter its first emission mode, e.g., a first correlated color temperature of 2700K or a first lumen level of 700 LM. If the tube lamp 500 is then turned off (by toggling the switch 90 into its off position) and on again (by toggling the switch 90 to its on position) within a specified time window, the tube lamp 500 can enter the second emission mode, e.g., a second correlated color temperature of 3500K or a second lumen level of 900 LM. If the tube lamp 500 is thereafter turned off again (by toggling the switch 90 into its off position) and on again (by toggling the switch 90 to its on position) within a specified time window, the tube lamp 500 can enter the third emission mode, e.g., a third correlated color temperature of 4000K or a third lumen level of 1500 LM. If the tube lamp 500 is thereafter turned off again (by toggling the switch 90 into its off position) and on again (by toggling the switch 90 to its on position) within a specified time window, the tube lamp 500 will return to the first emission mode, e.g., a first correlated color temperature of 2700K or a first lumen level of 700 LM.

The duration of each of time window for toggling the switch 90 to change lighting modes may be customized, as desired, and in at least some cases may be about 3 seconds or less. For example, in some embodiments, the duration of the time windows may be about 2.5 seconds or less. In another example, the duration of the time windows may be about 2 seconds or less. In yet another example, the duration of each of the time windows may be about 1.5 seconds or less. In some instances, either (or both) the first and second time windows may be user-programmable.

Referring to FIG. 9, in some embodiments, a wall switch driver 124 may be a single-channel or multi-channel electronic driver configured to drive the solid state light emitters, e.g., LEDs 201, utilizing pulse-width modulation (PWM) dimming or any other suitable standard, custom, or proprietary driving techniques to provide the different light setting selected through the wall ON/OFF switch 90, as described with reference to FIG. 8. The wall switch driver 124 may be in electrical communication with the LED string switching scheme 602, as depicted in FIG. 6.

As further shown in FIG. 9, the driver 124 may include a controller 130. In accordance with some embodiments, the driver 124 may be configured to provide a tube lamp 500 with a three-mode operation; that is, the driver 124 may provide tube lamp 500 with: (1) a first emission mode 127 e.g., a first lumen level of 700 LM; (2) a second emission mode 128, e.g., a second lumen level of 900 LM; and (3) a third emission mode 129, e.g., a third lumen level of 1500 LM.

In some embodiments, the tube lamp 500 having the three aforementioned light modes, i.e., first emission mode 127, a second emission mode 128, and third emission mode 129 (having settings set depending upon being practiced in the embodiments illustrated in FIG. 10 or 11) depending upon the application to the driver 124 to the embodiments depicted in FIGS. 2 and 3 may be driven by the driver 124 including a controller 130 configured to support mode changing for the tube lamp 500 based, in part or in whole, on hysteresis. For example, mode changing of the tube lamp 500 may be based, in part or in whole, on the hysteresis phenomena of a switch 90, e.g., light switch, in operation toggling between ON and OFF electrical states. In accordance with some embodiments, the output of LEDs for the strings of LEDs 201, and thus the tube lamp 500 may be electronically controlled by controller 130. To such ends, the controller 130 may be operatively coupled with the LEDs 201 for the strings of LEDs 201 (or light source 200 more generally), for instance, by a communication bus or other suitable interconnect. In some embodiments, the controller 130 may be configured to communicate with the LEDs, i.e., solid state light emitters, via any one, or combination, of suitable standard, custom, or proprietary wired or wireless digital communications protocol.

In accordance with some embodiments, the first emission mode 127, the second emission mode 128, and the third emission mode 129 (having settings set depending upon being practiced in the embodiments illustrated in FIG. 8 of the controller 130 may be implemented in any suitable standard, custom, or proprietary programming language, such as, for example, C, C++, objective C, JavaScript, or any other suitable instruction set, as will be apparent in light of this disclosure. The module(s) of controller 130 can be encoded, for example, on a machine-readable medium that, when executed by a processor, carries out the functionality of the tube lamp 500, in part or in whole. The computer-readable medium may be, for example, a hard drive, a compact disk, a memory stick, a server, or any suitable non-transitory computer or computing device memory that includes executable instructions, or a plurality or combination of such memories. Some embodiments can be implemented, for instance, with gate-level logic, an application-specific integrated circuit (ASIC) or chip set, or other such purpose-built logic. Some embodiments can be implemented with a microcontroller having input/output capability (e.g., inputs for receiving user inputs; outputs for directing other components) and embedded routines for carrying out device functionality. In a more general sense, the functional modules of controller 130 can be implemented in any one, or combination, of hardware, software, and firmware, as desired for a given target application or end-use.

Moreover, in some embodiments, a given module of controller 130 (or controller 130 more generally) may be programmable to achieve any of the various functions and emissions capabilities desired of the tube lamp 500 for a given target application or end-use. The present disclosure is not intended to be limited only to these example lighting control modules and output signals; as additional and/or different lighting control modules and output signals may be provisioned, as desired for a given target application or end-use.

Further, it is not intended to be limited only to drivers 124 including these specific example controllers 130. In a more general sense, and in accordance with some other embodiments, controller 130 can be any power supply controller IC or microcontroller having the ability to sense the operation of the input power (e.g., based on the on/off state of switch 90, discussed below) while maintaining a hysteresis from on-to-off and off-to-on control, with LED string control being provided by controlling the on/off state of the LEDs in the strings of LEDs 201. In some still other cases, controller 130 may be a microcontroller programmed to receive a control input from a wired or wireless source other than, or in addition to, a switch (e.g., such as switch 90) and accordingly generate a target mode of lighting, e.g., the first emission mode 127, the second emission mode 128, and the third emission mode 129 (having settings set depending upon being practiced in the embodiments illustrated in FIG. 8), by controlling the duty cycle of the strings of LEDs 201.

Returning to FIG. 9, the tube lamp 500 optionally may include a communication module 126, which may be configured as a transmitter, a receiver, or both (i.e., a transceiver). In some cases, communication module 126 may be separate and distinct from controller 130 (e.g., as generally shown in FIG. 9), though in some other cases, communication module 126 may be a component of or otherwise integrated with controller 130. In accordance with some embodiments, controller 130 may be configured to output control signal(s) to the strings of LEDs 201 based, at least in part, on input received from a remote source, such as a control interface 140.

Control interface 140 may be physical, virtual, or a combination thereof and may be configured to communicate with the controller 130 (via intervening communication module 126), which in turn interprets input received from control interface 140 distributes desired control signal(s) to the strings of LEDs 201 of the light source 200. In some embodiments, the control interface 140 may be employed, in accordance with some embodiments, in changing the emissions modes of tube lamp 500. In some embodiments, the control interface 140 interacts with the switch 90, e.g., over the communications module 126, as the switch toggles from the ON and Off electrical states, and provides the signal to the driver 124. The driver 124 receiving the signal from the control interface employing the controller 130 sends a signal to illuminate selected strings of LEDs 201 to provide the first emission mode 127, the second emission mode 128, or the third emission mode 129 (having settings set depending upon being practiced in the embodiments illustrated in FIG. 8).

To such ends, the communication module 126 and control interface 140 may be configured for wired or wireless communication (or both) utilizing any one, or combination, of suitable means, such as Universal Serial Bus (USB), Ethernet, FireWire, Wi-Fi, Bluetooth, or ZigBee, among others. Optionally, the control interface 140 may be or otherwise employ a touch-sensitive display or surface, such as a touchpad or other device with a touch-based user interface (UI) or graphical UI (GUI), as provided by a computing device, mobile or otherwise. Other suitable configurations for the communication module 126 and the control interface 65 will depend on a given application.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS.

Having described preferred embodiments of methods and structures relating to a hybrid light emitting diode tube with selectable light settings, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A lamp comprising:
   a light source including at least one string of light emitting diodes within a tube body;
   end caps having pin contacts on each end of the tube body;
   driver electronics including a filament detector portion provided by a passive resistance capacitor (RC) circuit that simulates the filament load of a fluorescent lamp when installed into a ballast containing fixture, the filament detector portion providing that the lamp be compatible with type A T8 lamp ballasts and drivers, type B lamps that operate on a direct line voltage of 120/277V or 347V, T12 lamp that operates with magnetic ballasts and T12 lamp that operate with electric ballasts;
   a first switch for selecting color correlated temperature light characteristics for light emitted by the light source;
   a second switch for selecting dimming light characteristics for light emitted by the light source; and
   an electronic safety switch that ensures that the lamp can not be turned on unless both of the pin contacts of the end caps are inserted in to a lamp socket.

2. The lamp of claim 1, wherein the at least one of the first and the second switch for selecting light characteristics is positioned on at least one of the end caps.

3. The lamp of claim 2, wherein the at least one of the first and the second switch is present on an exterior sidewall of the at least one end caps.

4. The lamp of claim 1, wherein the contacts have a G13 pin layout.

5. The lamp of claim 1, wherein the light emitting diodes are surface mount device (SMD) light emitting diodes.

6. The lamp of claim 1, wherein the at least one of the first and the second switch for selecting light characteristics is selected from the group consisting of a slide switch, a rocker switch, toggle switch, selector switch or a combination thereof.

7. The lamp of claim 1, wherein the first switch selects one of at least three color correlated temperature settings for the light emitted by the light source.

8. The lamp of claim 7, wherein the at least three color correlated temperature settings for selection by the first switch is selected from the group consisting of 3000K, 4000K, 5000K and combinations thereof.

9. A lamp comprising:
   a light source including at least one string of light emitting diodes on a printed circuit board present within a tube body;
   end caps having contacts with a G13 pin layout on each end of the tube body;
   driver electronics including a filament detector portion provided by a passive resistance capacitor (RC) circuit that simulates the filament load of a fluorescent lamp when installed into a ballast containing fixture for a T12 lamp or a type A T8 lamp, the filament detector portion providing that the lamp be compatible with type A T8 lamp ballasts and drivers, type B lamps that operate on a direct line voltage of 120/277V or 347V, T12 lamp that operates with magnetic ballasts and T12 lamp that operate with electric ballasts;

a first switch for selecting color correlated temperature light characteristics for light emitted by the light source;

a second switch for selecting dimming light characteristics for light emitted by the light source; and an electronic safety switch that ensures that the lamp can not be turned on unless both of the pin contacts of the end caps are inserted in to a lamp socket.

10. The lamp of claim 9, wherein the at least one of the first and the second switch for selecting light characteristics is positioned on at least one of the end caps.

11. The lamp of claim 9, wherein the at least one of the first and the second switch is present on an exterior sidewall of the at least one end caps.

12. The lamp of claim 9, wherein the at least one of the first and the second switch for selecting light characteristics is selected from the group consisting of a slide switch, a rocker switch, toggle switch, selector switch or a combination thereof.

13. The lamp of claim 9, wherein the first switch selects one of at least three color correlated temperature settings for the light emitted by the light source.

14. The lamp of claim 13, wherein the at least three color correlated temperature settings for selection by the first switch is selected from the group consisting of 3000K, 4000K, 5000K and combinations thereof.

15. A lamp comprising:

a light source present within a tube body;

end caps having contacts on each end of the tube body;

a first switch present on a first end cap of the end caps for selecting light characteristics for light emitted by the light source, the light characteristics including at least one of color correlated temperature (CU) and color, wherein each lighting characteristic has at least three selectable settings a second switch for selecting dimming light characteristics for light emitted by the light source; and an electronic safety switch that ensures that the lamp can not be turned on unless both of the pin contacts of the end caps are inserted in to a lamp socket.

16. The lamp of claim 15, wherein the light source comprises at least one string of light emitting diodes.

17. The lamp of claim 15, wherein the at least one switch is present on an exterior sidewall of the at least one end caps.

18. The lamp of claim 15, wherein the at least one switch for selecting light characteristics is selected from the group consisting of a slide switch, a rocker switch, toggle switch, selector switch or a combination thereof.

* * * * *